(12) United States Patent
Wilson et al.

(10) Patent No.: US 11,490,732 B2
(45) Date of Patent: Nov. 8, 2022

(54) STAIRLIFT CHAIR

(71) Applicant: Stannah Stairlifts Limited, Hampshire (GB)

(72) Inventors: Alexander Henry Gage Wilson, Hampshire (GB); Benjamin Dobbin, Fleet Hampshire (GB)

(73) Assignee: STANNAH STAIRLIFTS LIMITED, Hampshire (GB)

( * ) Notice: Subject to any disclaimer, the term of this patent is extended or adjusted under 35 U.S.C. 154(b) by 30 days.

(21) Appl. No.: 17/047,101

(22) PCT Filed: Apr. 11, 2019

(86) PCT No.: PCT/GB2019/051056
§ 371 (c)(1),
(2) Date: Oct. 13, 2020

(87) PCT Pub. No.: WO2019/197840
PCT Pub. Date: Oct. 17, 2019

(65) Prior Publication Data
US 2021/0161295 A1    Jun. 3, 2021

(30) Foreign Application Priority Data
Apr. 12, 2018    (GB) .................................. 1806029

(51) Int. Cl.
*A47C 1/00*    (2006.01)
*B60N 2/02*    (2006.01)
(Continued)

(52) U.S. Cl.
CPC .................. *A47C 1/00* (2013.01); *A47C 3/16* (2013.01); *A47C 4/28* (2013.01); *A47C 7/72* (2013.01);
(Continued)

(58) Field of Classification Search
CPC .... A47C 1/00; A47C 3/16; A47C 4/28; A47C 7/72; A47C 7/54; A47C 7/56;
(Continued)

(56) References Cited

U.S. PATENT DOCUMENTS 180,610 A * 8/1876 Lungren ................ A47C 4/286
297/16.2
306,989 A * 10/1884 Yandell .................... A47C 4/40
297/18

(Continued)

FOREIGN PATENT DOCUMENTS

CA         977665 A      11/1975
CN     204561513 U *   8/2015 ............. A47C 4/286
(Continued)

OTHER PUBLICATIONS

International Search Report dated Jul. 23, 2019; International Application PCT/GB2019/051056.
(Continued)

*Primary Examiner* — Robert Canfield
(74) *Attorney, Agent, or Firm* — Dinsmore & Shohl LLP

(57) ABSTRACT

A stairlift chair has a hand control displaceable in a fore/aft direction. Other aspects include a hand control which is mounted at a point beneath the armrest and a fabric covering which is applied to the armrests and the backrest support.

7 Claims, 3 Drawing Sheets

(51) Int. Cl.
  *B66B 9/08* (2006.01)
  *A47C 7/72* (2006.01)
  *A47C 4/28* (2006.01)
  *A47C 3/16* (2006.01)
  *B60N 2/75* (2018.01)
  *B64D 11/00* (2006.01)
(52) U.S. Cl.
  CPC ............ *B60N 2/0228* (2013.01); *B60N 2/75* (2018.02); *B64D 11/00155* (2014.12)
(58) Field of Classification Search
  CPC .. B60N 2/0228; B60N 2/75; B64D 11/00155; B66B 9/0853; B66B 9/08
  USPC ...... 297/35, 45, 129, 225, 228, 286, 411.44; 187/200, 201
  See application file for complete search history.

(56) References Cited

U.S. PATENT DOCUMENTS

| | | | | |
|---|---|---|---|---|
| 1,963,708 A * | 6/1934 | Marvin | .................. | A47C 1/146 297/31 |
| 2,446,141 A * | 7/1948 | Parsons | .................. | E05F 15/57 24/561 |
| 2,658,555 A * | 11/1953 | Paull | .................. | A47C 3/021 297/411.44 |
| 2,838,095 A * | 6/1958 | Deaton | .................. | A47C 7/443 297/301.4 |
| D194,741 S * | 3/1963 | Deaton | .................. | D6/366 |
| 3,087,758 A * | 4/1963 | Deaton | .................. | A47C 7/002 297/440.22 |
| 3,124,387 A * | 3/1964 | Maclaren | .................. | A47C 4/286 297/16.2 |
| D202,548 S * | 10/1965 | Kramer | .................. | 297/411.4 |
| 3,950,807 A | 4/1976 | Sharpe | | |
| D241,792 S * | 10/1976 | Wehner | .................. | D6/368 |
| D251,043 S * | 2/1979 | Persson | .................. | D6/374 |
| 4,211,905 A * | 7/1980 | Quigley | .................. | H02B 1/048 248/27.3 |
| D256,300 S * | 8/1980 | Yoshimura | .................. | D6/368 |
| 4,340,795 A * | 7/1982 | Arthur | .................. | H02B 1/048 248/27.3 |
| 4,367,894 A * | 1/1983 | Manuel | .................. | A47C 4/04 297/30 |
| 4,466,665 A * | 8/1984 | Aronowitz | .................. | A47C 1/03 297/411.41 |
| 4,786,106 A * | 11/1988 | Bottemiller | .................. | A47C 3/0252 297/303.3 |
| 5,054,849 A * | 10/1991 | Hoff | .................. | A47C 4/286 297/440.11 |
| 5,230,405 A * | 7/1993 | Bartelt | .................. | B66B 9/0815 187/290 |
| 6,070,937 A * | 6/2000 | Ginat | .................. | A47C 7/445 297/285 |
| D526,146 S * | 8/2006 | Kita | .................. | D6/379 |
| 7,422,288 B2 * | 9/2008 | Ahearn | .................. | A61G 15/12 297/411.39 |
| 7,950,684 B2 * | 5/2011 | Borisoff | .................. | A61G 5/12 297/35 |
| D648,093 S * | 11/2011 | Woodhams | .................. | D34/35 |
| D727,046 S * | 4/2015 | Alexander | .................. | D6/356 |
| D777,494 S * | 1/2017 | Prestwich | .................. | D6/716.4 |
| 10,519,002 B2 * | 12/2019 | Cook | .................. | B66B 1/30 |
| 10,752,467 B2 * | 8/2020 | Pugh | .................. | B66B 9/0853 |
| 2002/0074189 A1 * | 6/2002 | Hester | .................. | B66B 9/08 187/245 |
| 2002/0190555 A1 * | 12/2002 | Holbrook | .................. | A47C 7/441 297/300.4 |
| 2006/0061177 A1 * | 3/2006 | Billger | .................. | B60N 2/14 297/344.21 |
| 2008/0271953 A1 * | 11/2008 | Vroegindeweij | .................. | B66B 9/0838 187/245 |
| 2012/0012385 A1 * | 1/2012 | Lee | .................. | B60N 2/0228 174/561 |
| 2016/0016496 A1 | 1/2016 | Lacey | | |
| 2018/0078040 A1 * | 3/2018 | Mubarak | .................. | A47C 3/16 |
| 2018/0249837 A1 * | 9/2018 | Cohen | .................. | A47C 4/28 |
| 2019/0382243 A1 * | 12/2019 | Van Eijgen | .................. | B66B 5/02 |
| 2020/0398720 A1 * | 12/2020 | Tait | .................. | B60N 2/0232 |
| 2021/0153655 A1 * | 5/2021 | Wilson | .................. | A47C 7/56 |
| 2021/0154064 A1 * | 5/2021 | Kim | .................. | A61G 5/125 |
| 2021/0253399 A1 * | 8/2021 | Wilson | .................. | B66B 9/08 |

FOREIGN PATENT DOCUMENTS

| | | | | |
|---|---|---|---|---|
| CN | 213099135 U * | 5/2021 | | |
| DE | 1426922 A1 | 2/1996 | | |
| DE | 29819123 U1 * | 12/1998 | ............... | A47C 4/40 |
| EP | 2184754 A1 * | 5/2010 | ........... | B60N 2/0228 |
| GB | 1387216 A | 3/1975 | | |
| GB | 2469093 A | 10/2010 | | |
| GB | 2503199 A | 12/2013 | | |
| GB | 2572805 A * | 10/2019 | ............... | A47C 1/00 |
| GB | 2572807 A * | 10/2019 | ............. | A47C 1/031 |
| JP | 2001335260 A | 12/2001 | | |
| JP | 2010070358 A | 4/2010 | | |
| NO | 20130985 A1 | 1/2015 | | |
| NO | 336092 B1 | 5/2015 | | |

OTHER PUBLICATIONS

German Search Report dated Oct. 6, 2018; German Application No. GB1806029.3.

* cited by examiner

STAIRLIFT CHAIR

CROSS-REFERENCE TO RELATED APPLICATIONS

This application is the U.S. national stage of PCT/GB2019/051056 filed Apr. 11, 2019, which claims priority of United Kingdom patent application 1806029.3 filed Apr. 12, 2018, both of which are hereby incorporated by reference in their entirety.

FIELD OF THE INVENTION

This invention relates to stairlifts and, in particular, to aspects of a stairlift chair.

BACKGROUND TO THE INVENTION

A stairlift is typically used by persons having one or more physical limitations. The inability to climb stairs without difficulty is an obvious limitation but is often accompanied by a lack of dexterity in limbs other than the legs. For example, stairlift users often lack hand dexterity which can lead to difficulty in operating the control that is mounted on an armrest, the displacement of which causes the stairlift to move up and down the staircase.

Conventionally, during operation of a stairlift, the stairlift chair is aligned perpendicular to the direction of travel and the stairlift user displaces the hand control in the desired direction of travel. That is to say, if the stairlift is at the bottom of the staircase, the user displaces the hand control in an uphill direction and, when the stairlift is at the upper end of the staircase, travel is initiated by displacing the hand control in a downward direction. Whilst attempts have been made to reduce user discomfort, existing forms of hand control require some rotation of the wrist and, in many cases, some raising of the wrist and forearm from the armrest.

From a manufacturing perspective, the armrest on which the hand control is mounted must be formed to receive the control and any upholstery covering the armrest is inevitably disrupted or shortened to allow the hand control to be mounted, and its range of movement accommodated.

It is an object of the invention to provide a stairlift chair or parts thereof which will go at least some way in addressing the aforementioned problems; or which will at least provide a novel and useful choice.

SUMMARY OF THE INVENTION

Accordingly, in a first aspect, the invention provides a stairlift chair having a seat base; a back support; at least one armrest; and a hand control mounted on said at least one armrest to effect movement of a stairlift of which said chair forms part, wherein said at least one armrest has a length dimension and a lesser width dimension and wherein said hand control is configured for displacement substantially in directions along said length dimension.

Preferably said at least one armrest has an upper surface wherein said hand control comprises a hand contact member moveable above said upper surface, said hand contact member being mounted to a switch facility located below said upper surface, and wherein no part of said hand control passes through said upper surface.

Preferably said hand contact member is pivotally attached to said switch facility.

Preferably said hand contact member comprises a lever extending substantially parallel to said width dimension.

Preferably a pair of armrests are provided, said armrests being defined, in part, by flexible members.

Preferably said stairlift chair further includes a backrest support, said flexible members being fixed to opposite ends of said backrest support.

Preferably said stairlift chair further includes a fabric cover covering said armrests and said backrest support and underlying said hand contact member.

In a second aspect the invention provides a stairlift chair having a seat base; a backrest; a backrest support; and a pair of armrests attached to and extending from said backrest support, said armrests having upper surfaces wherein said chair further includes a single fabric covering overlying said backrest support and said upper surfaces.

Preferably a distal end of each of said armrests is defined by a downwardly directed post and wherein said covering extends downwardly over a forward edge of each said post.

Preferably each said armrest is defined in part by a flexible member.

In a third aspect the invention provides a stairlift chair having a seat base; a back support; and a pair of armrests, each armrest having a length, a proximal end at or adjacent to said backrest, and a distal end, wherein part of said length is comprised by a flexible member.

Preferably an end of said flexible member comprises said proximal end.

Preferably said flexible member is substantially inelastic.

Preferably said distal end is defined by an upper end of a downwardly directed post.

Preferably said downwardly post is pivotally mounted to a linkage configured to enable said seat base to be displaced between a use position and a folded position.

In a fourth aspect the invention provides a stairlift including the chair as set forth above.

Many variations in the way the present invention can be performed will present themselves to those skilled in the art. The description which follows is intended as an illustration only of one means of performing the invention and the lack of description of variants or equivalents should not be regarded as limiting. Subject to the scope of the appended claims, wherever possible, a description of a specific element should be deemed to include any and all equivalents thereof whether in existence now or in the future.

BRIEF DESCRIPTION OF THE DRAWINGS

The various aspects of the invention will now be described with reference to the example shown in the accompanying drawings in which.

DETAILED DESCRIPTION OF WORKING EMBODIMENT

Figure 1:
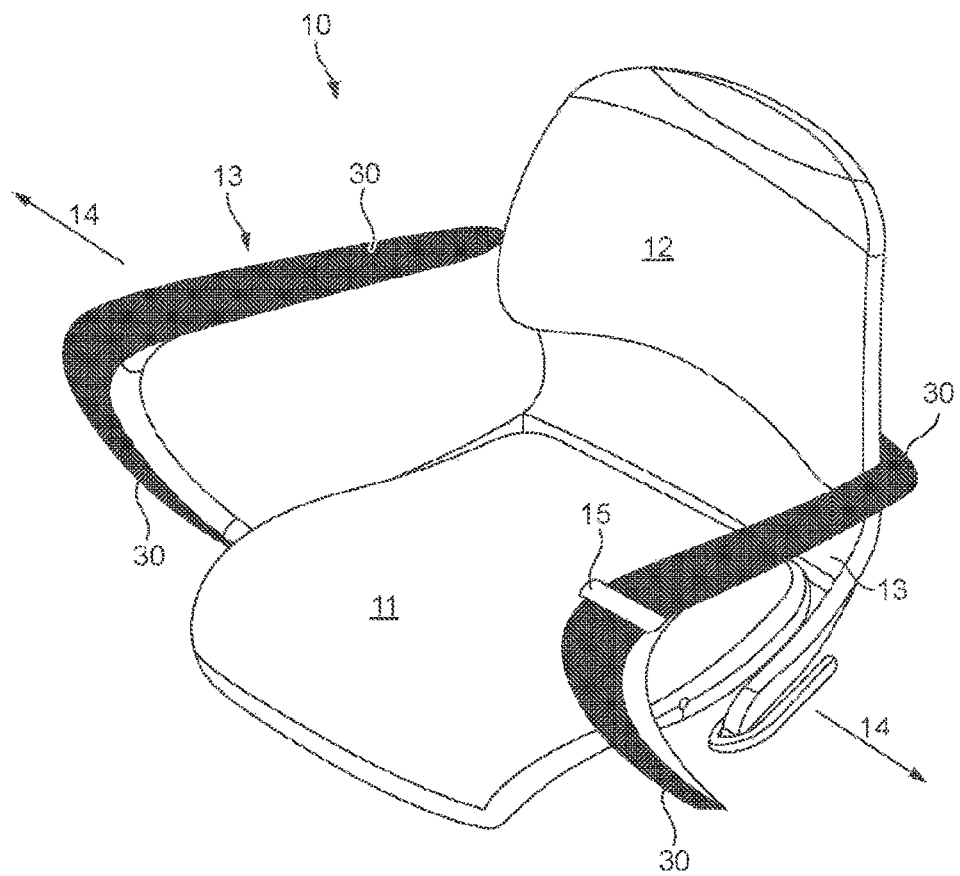
FIG. 1 is an isometric view of a stairlift chair incorporating the various aspects of the invention.

Referring firstly to FIG. 1, the present invention provides a stairlift chair 10 having a seat base 11, a backrest 12 and a pair of armrests 13. As shown in FIG. 1, the chair is in a 'use' configuration. That is to say the seat base is in a substantially horizontal position to receive a user and the chair is facing perpendicular to the direction of travel of the stairlift as indicated by arrows 14. As will be readily appreciated by those skilled in the art, the chair 10 also has a folded configuration in which the seat base is folded up to a position adjacent to the backrest 12; however the folding aspect is covered in a co-pending patent application, is not relevant to aspects of the invention covered in this patent application, and will not be described in further detail herein.

In the conventional manner the chair 10 is mounted on a carriage (not shown) which, in turn, moves along a rail (not shown) fixed to a staircase. A hand control 15 is positioned on one of the armrests 13 to enable a user to control this movement by displacement of the hand control.

Turning to FIGS. 2, 3, 4 and 5, each armrest has a proximal end 16 adjacent to the backrest 12, a distal end 17, a length direction L and a shorter width direction W. Each armrest 13 also includes an upper surface 18.

Figure 2:
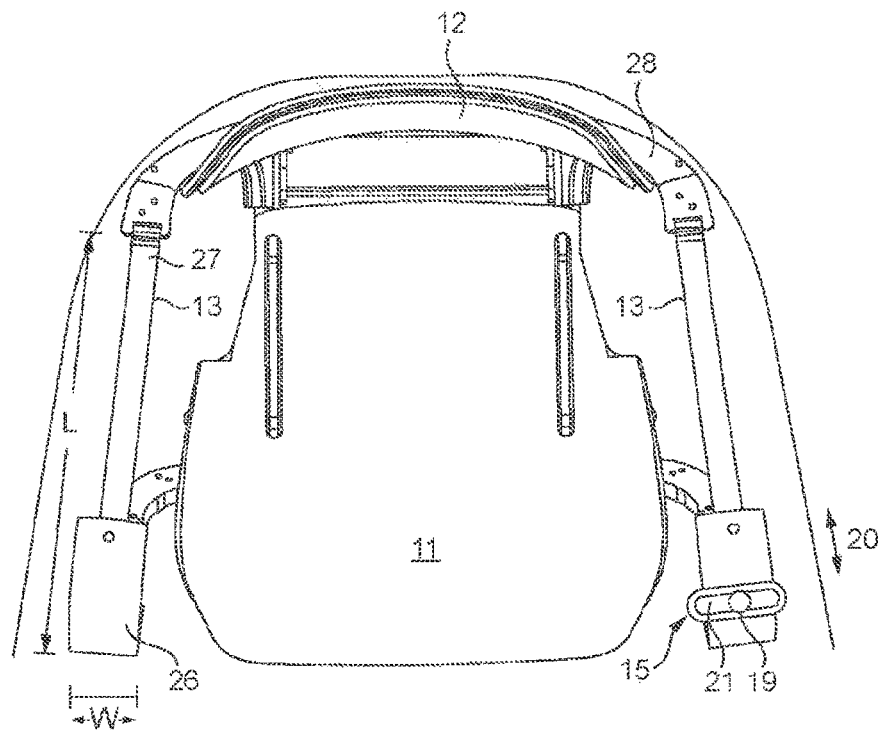
FIG. 2 is a plan view of some structural elements of the invention.

According to a first aspect of this invention the hand control is configured to move in the direction of the length direction L as illustrated by arrow 20 in FIG. 2; that is, in a forward/rearward direction as distinct from the side-to-side direction of existing stairlift hand controls.

Figure 5:
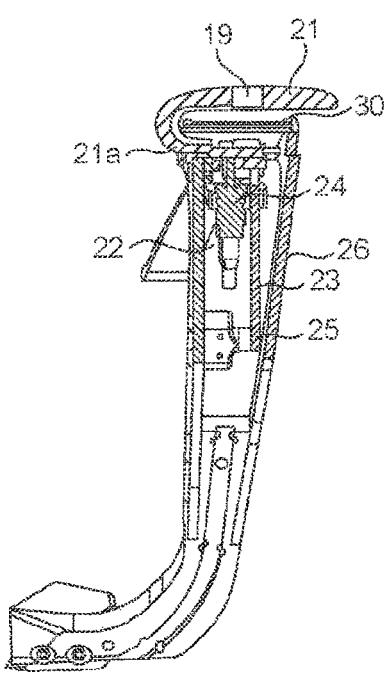
FIG. 5 is a front elevational view, partly in section, giving detail of the hand control shown in the previous views.

In the preferred form shown, the hand control comprises a lever 21 spaced above, but close to, the upper surface 18 of the armrest 13 and extending substantially in the direction of width W of the armrest. The lever 21 is operatively connected to a switching facility 22 that is located beneath the surface 18. An important feature of this aspect of the invention is that no part of the hand control passes through the upper surface 18. With reference to FIG. 5, in the form shown, the lever 21 is configured to wrap around an edge of the armrest 13, a lower leg 21a of the lever passing through a cut-out (not shown) in the upper edge of the armrest to then engage with switching facility 22 located within the armrest.

It is preferred that the fore/aft movement of lever 21 be as near to linear as possible; that is to say movement in which the displacement of the operating lever is not only confined to fore and aft movement in the direction of arrow 20 but also that movement of the lever 21 in a vertical direction relative to the upper surface of the armrest is minimised. The present invention describes an arrangement that provides a near-linear operating action while being relatively straight forward to implement.

As can be seen in FIG. 5, the switching facility 22 includes a switch 24 which is contacted and operated by leg 21a. The switch 24 may be located in an upper part of the switching facility 22 while leg 21a is mounted to an arm 23 pivoting on a mounting 25 located some distance down the inner surface of the armrest support. This enables readily available switches 24 to be used while substantially reducing the arc through which the lever 21 moves. This arrangement means that the movement of the lever 21 experienced by a user is more linear than arcuate and, once the user's hand is engaged over the control, does not require raising or lowering of the wrist to operate the control. The upper surface of the lever may be domed as shown to locate easily in the palm of a user's hand. In this regard, the dimension and spacing of the lever 21 relative to the armrest 13 is preferably such that a user can fold his/her hand over the lever 21 and then displace the lever by simply sliding the forearm in a linear manner along the surface of the armrest.

As with conventional stairlift hand controls, a spring facility (not shown) is included to displace the lever 21 to a neutral or 'off' position. Displacing the lever in one direction from the off position, for example back, will cause the stairlift to move in an uphill direction while displacement in the opposite direction will cause the stairlift to move in the downhill direction. A further feature is that a commissioning procedure effected at installation of the stairlift may allow a user to select which direction of the hand control will initiate uphill movement and which will initiate downhill movement.

As a further convenience, the lever 21 may include a push-button 19, the use of which causes the chair footrest (not shown) to lower.

As stated above, a feature of the hand control and switching facility is that it does not interfere in any manner with the upper surface of the armrest to which it is mounted. This means that, with minimal adaption, the hand control may be changed from one armrest to another to address a user preference.

Figure 3:
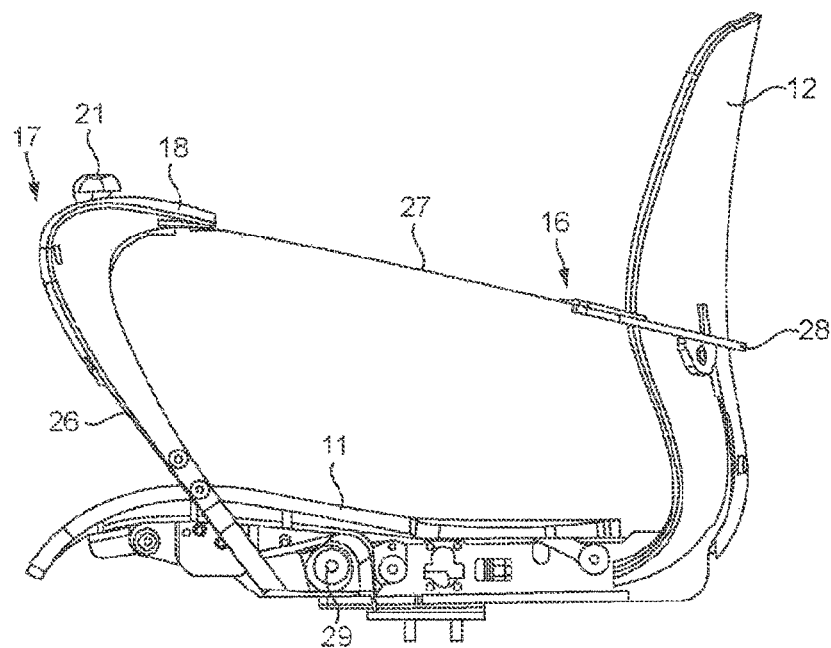
FIG. 3 is an elevation view of that which is shown in FIG. 2.

In a second aspect of the invention, the armrests 13 are part defined by a flexible member. Referring to FIGS. 2 and 3, the distal end 17 of each armrest is provided on the upper end of a downwardly directed post 26, the post 26 being fabricated, cast or otherwise formed from a solid material such as metal. Extending rearward from the post 26 toward the backrest 12 is a flexible member, preferably in the form of a strap 27, the rear end of which defines the proximal end of the armrest and attaches to an end of backrest support 28. The strap is preferably formed from a webbing material that is substantially inelastic. This flexible element of the armrest enables a particular form of folding to be accommodated while ensuring the 'use' configuration of the chair can be maintained in a secure fashion. The folding function involves the post 26 pivoting at its lower end about axis 29.

A common drawback of existing stairlift chairs is that they are somewhat clinical in appearance and this can act as a deterrent to the installation of a stairlift in situations where a stairlift is clinically necessary or at least most desirable. In a further aspect the invention seeks to address this drawback by providing, configuring and covering surfaces of the chair to look more like an item of domestic furniture and less like a piece of functional medical equipment. To this end a single fabric covering 30 is provided which covers the backrest support 28 and the armrests 13. Given that the armrests are in part defined by downwardly directed posts 26, the fabric covering 30 is preferably continued down to cover the front surfaces of the posts 26. The finished appearance of the fabric covering is shown in solid black in FIG. 1.

Figure 4:
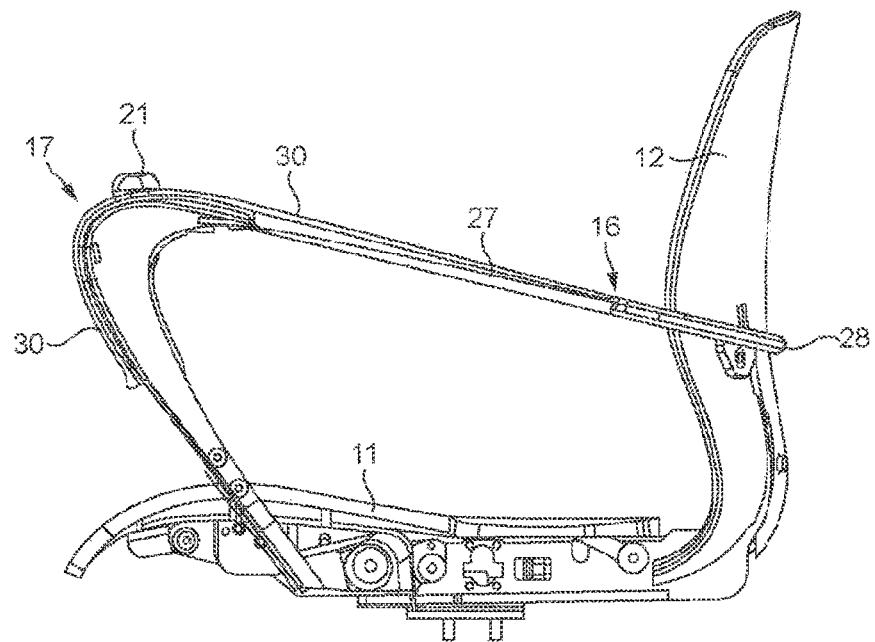
FIG. 4 is a similar view to FIG. 3 but with the addition of some aesthetic elements.

As can be seen in FIG. 4, the covering 30 is preferably formed into sleeves where covering the flexible armrest sections 27, and may be wrapped around the upper, lower and edge surfaces of the backrest support 28.

It will thus be appreciated that the various aspects of the invention, at least in the case of the embodiment described, provides a stairlift chair that has a number of significant benefits including:

i) The hand control arrangement eliminates the need for a user to rotate the wrist. Movement of the stairlift can be initiated from elbow movement and even shoulder movement. This is of considerable benefit to users who suffer from wrist pain such as arthritis.

ii) The arrangement of lever acting above the armrest and switching facility located beneath the armrest means that the upper surface of the armrest can be provided with an uninterrupted surface finish. Further, inventory requirements are reduced and the hand control can be readily fitted to whichever armrest is more convenient for the intended user.

iii) The arrangement of backrest support, flexible armrests and armrest posts lend themselves to uniform coverage by aesthetically pleasing materials while still allowing for necessary folding functions to be accommodated.

The invention claimed is:

1. A stairlift chair comprising:
   a seat base;
   a back support;
   at least one armrest; and
   a hand control mounted on said at least one armrest to effect movement of a stairlift of which said chair forms part, said at least one armrest having a length dimension and a lesser width dimension and said hand control being configured for displacement substantially in directions along said length dimension,
   wherein said hand contact member comprises a lever extending substantially parallel to said width dimension,
   wherein said at least one armrest has an upper surface and wherein said hand control comprises a hand contact member moveable above said upper surface, said hand contact member being mounted to a switch facility located below said upper surface and wherein no part of said hand control passes through said upper surface.

2. A stairlift chair as claimed in claim 1, wherein said hand contact member is pivotally attached to said switch facility.

3. A stairlift chair as claimed in claim 1, wherein said at least one armrest comprises a pair of armrests, said armrests being defined, in part, by flexible strap members.

4. A stairlift chair as claimed in claim 1, further including a backrest support, said flexible strap members being fixed to opposite ends of said backrest support.

5. A stairlift chair as claimed in claim 1, further including a fabric cover covering said armrests and said backrest support and underlying said hand contact member.

6. A stairlift including the chair as claimed in claim 1.

7. A stairlift chair comprising:
   a seat base;
   a backrest;
   at least one armrest having an upper surface; and
   a hand control wherein said hand control is configured for movement over said upper surface but is mounted at a point beneath said upper surface, no part of said hand control passing through said upper surface.

* * * * *